US010934950B2

(12) United States Patent
Murugesan et al.

(10) Patent No.: US 10,934,950 B2
(45) Date of Patent: Mar. 2, 2021

(54) SYSTEM AND METHOD TO CONTROL POWERTRAIN DURING DIRECTIONAL SHIFT

(71) Applicant: Caterpillar Inc., Deerfield, IL (US)

(72) Inventors: Shanmugahari Murugesan, Chennai (IN); Ethan V Ferguson, Oswego, IL (US); Abhishek Awana, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 124 days.

(21) Appl. No.: 16/254,100

(22) Filed: Jan. 22, 2019

(65) Prior Publication Data

US 2020/0232398 A1    Jul. 23, 2020

(51) Int. Cl.
| | | |
|---|---|---|
| *F02D 29/02* | (2006.01) | |
| *F16H 63/50* | (2006.01) | |
| *E02F 9/20* | (2006.01) | |
| *E02F 3/43* | (2006.01) | |
| E02F 3/28 | (2006.01) | |

(52) U.S. Cl.
CPC .............. *F02D 29/02* (2013.01); *E02F 3/431* (2013.01); *E02F 9/2004* (2013.01); *E02F 9/2066* (2013.01); *E02F 9/2079* (2013.01); *F16H 63/50* (2013.01); *E02F 3/283* (2013.01); *F02D 2200/50* (2013.01)

(58) Field of Classification Search
CPC .... F02D 29/02; F02D 2200/50; E02F 9/2004; E02F 9/2079; E02F 9/2066; E02F 3/431; E02F 3/283; F16H 63/50
See application file for complete search history.

(56) References Cited

U.S. PATENT DOCUMENTS

| | | | |
|---|---|---|---|
| 4,769,774 | A | 9/1988 | Narita et al. |
| 5,876,301 | A | 3/1999 | Tabata et al. |
| 8,182,394 | B2 | 5/2012 | Yamaguchi et al. |
| 8,262,540 | B2 | 9/2012 | Higaki et al. |
| 8,500,599 | B2 | 8/2013 | Ho et al. |
| 8,639,418 | B2 | 1/2014 | Bertsch et al. |
| 9,789,872 | B2 | 10/2017 | Satozono et al. |
| 2016/0237651 | A1* | 8/2016 | Miyamoto .............. E02F 9/202 |

* cited by examiner

*Primary Examiner* — Basil T. Jos

(57) ABSTRACT

A method for controlling powertrain of a machine not having a torque converter output speed sensor during a direction change of the machine is provided. The method includes retrieving a first desired engine speed value and a second desired engine speed value based on a detection of the direction change by a control module. The second desired engine speed value is determined based on a current gear setting of a gear shift lever and a desired gear setting of the gear shift lever. The method further includes determining the desired engine speed value based on a comparison between the first desired engine speed value and the second desired engine speed value by the control module. The control module is configured to identify a lower value of the first desired engine speed value and the second desired engine speed value as the desired engine speed value.

20 Claims, 4 Drawing Sheets

SYSTEM AND METHOD TO CONTROL POWERTRAIN DURING DIRECTIONAL SHIFT

TECHNICAL FIELD

The present disclosure relates to a machine, and more particularly, to a method for determining a desired engine speed value of an engine associated with the machine.

BACKGROUND

Construction machines, such as excavators, loaders, graders, and the like, generally include a transmission as a part of their powertrain. The powertrain further includes a torque converter that is positioned between an engine of the machine and the transmission. Operation of such machines involve gear shifting from a forward direction to a reverse direction, and vice versa. When an operator is requesting full power immediately after shifting from a reverse gear to a first forward gear setting, an available engine power reduces significantly as the shift completes. When an output speed of the torque converter is not known, this reduction in engine power is required to prevent excess torque from being transmitted to components of the powertrain. Due to absence of a torque converter output speed sensor on some machines, a transmission algorithm that is stored in a control module of the machine does not have a reference to limit the torque being applied to the powertrain to an acceptable value while the shift is in progress, except to eliminate a possibility of excess torque delivery until the shift is complete.

In current machines, when the transmission is engaged on a particular gear, the output speed of the torque converter is back calculated from a transmission output speed sensor associated with the machine. While shifting to the first forward gear setting from the reverse gear setting, the output speed of the torque converter is set to zero by default. Further, current machines employ a Powertrain Torque Strategy (PTS) algorithm and a Controlled Throttle Shifting (CTS) algorithm to determine a desired engine speed using look-up tables. Typically, a lower value of the engine speed values obtained from the corresponding PTS and CTS algorithms is set as the final engine speed. During a direction change, when the output speed of the torque converter is set to zero by default while clutch slipping, the desired engine speed that is obtained from lookup tables of the current algorithms results in inadequate performance of the machine for an extended period of time and also leads to operator complaints of low power.

U.S. Pat. No. 8,639,418 describes a method for operating a power system. The method includes receiving an operator request for a propulsion direction change. The method also includes directing power into a power source and reducing a supply of fuel to the power source while directing power into the power source. The method further includes basing a first threshold speed on a speed of the power source produced by directing power into the power source and increasing the supply of fuel to the power source when the speed of the power source falls below the first threshold speed.

SUMMARY OF THE DISCLOSURE

In one aspect of the present disclosure, a method for determining a desired engine speed value of an engine of a machine during a direction change of the machine is provided. The method includes retrieving a first desired engine speed value by a control module based on a detection of the direction change. The method also includes determining a second desired engine speed value by the control module based on the detection of the direction change. The second desired engine speed value is determined based on a current gear setting of a gear shift lever and a desired gear setting of the gear shift lever. The method further includes determining the desired engine speed value by the control module based on a comparison between the first desired engine speed value and the second desired engine speed value. The control module is configured to identify a lower value of the first desired engine speed value and the second desired engine speed value as the desired engine speed value.

In another aspect of the present disclosure, a powertrain for a machine is provided. The powertrain includes an engine. The powertrain also includes a torque converter connected to the engine. The powertrain further includes a transmission connected to the torque converter. The powertrain includes a control module configured to determine a desired engine speed value of the engine during a direction change of the machine. The control module is configured to retrieve a first desired engine speed value based on a detection of the direction change. The control module is also configured to determine a second desired engine speed value based on the detection of the direction change. The second desired engine speed value is determined based on a current gear setting of a gear shift lever and a desired gear setting of the gear shift lever. The control module is further configured to determine the desired engine speed value based on a comparison between the first desired engine speed value and the second desired engine speed value. The control module is configured to identify a lower value of the first desired engine speed value and the second desired engine speed value as the desired engine speed value.

In yet another aspect of the present disclosure, a machine is provided. The machine includes a frame. The machine also includes an implement connected to the frame of the machine. The machine further includes an engine supported by the frame of the machine. The machine includes a torque converter connected to the engine. The machine also includes a transmission connected to the torque converter. The machine further includes a control module configured to determine a desired engine speed value of the engine during a direction change of the machine. The control module is configured to retrieve a first desired engine speed value based on a detection of the direction change. The control module is also configured to determine a second desired engine speed value based on the detection of the direction change. The second desired engine speed value is determined based on a current gear setting of a gear shift lever and a desired gear setting of the gear shift lever. The control module is further configured to determine the desired engine speed value based on a comparison between the first desired engine speed value and the second desired engine speed value. The control module is configured to identify a lower value of the first desired engine speed value and the second desired engine speed value as the desired engine speed value.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
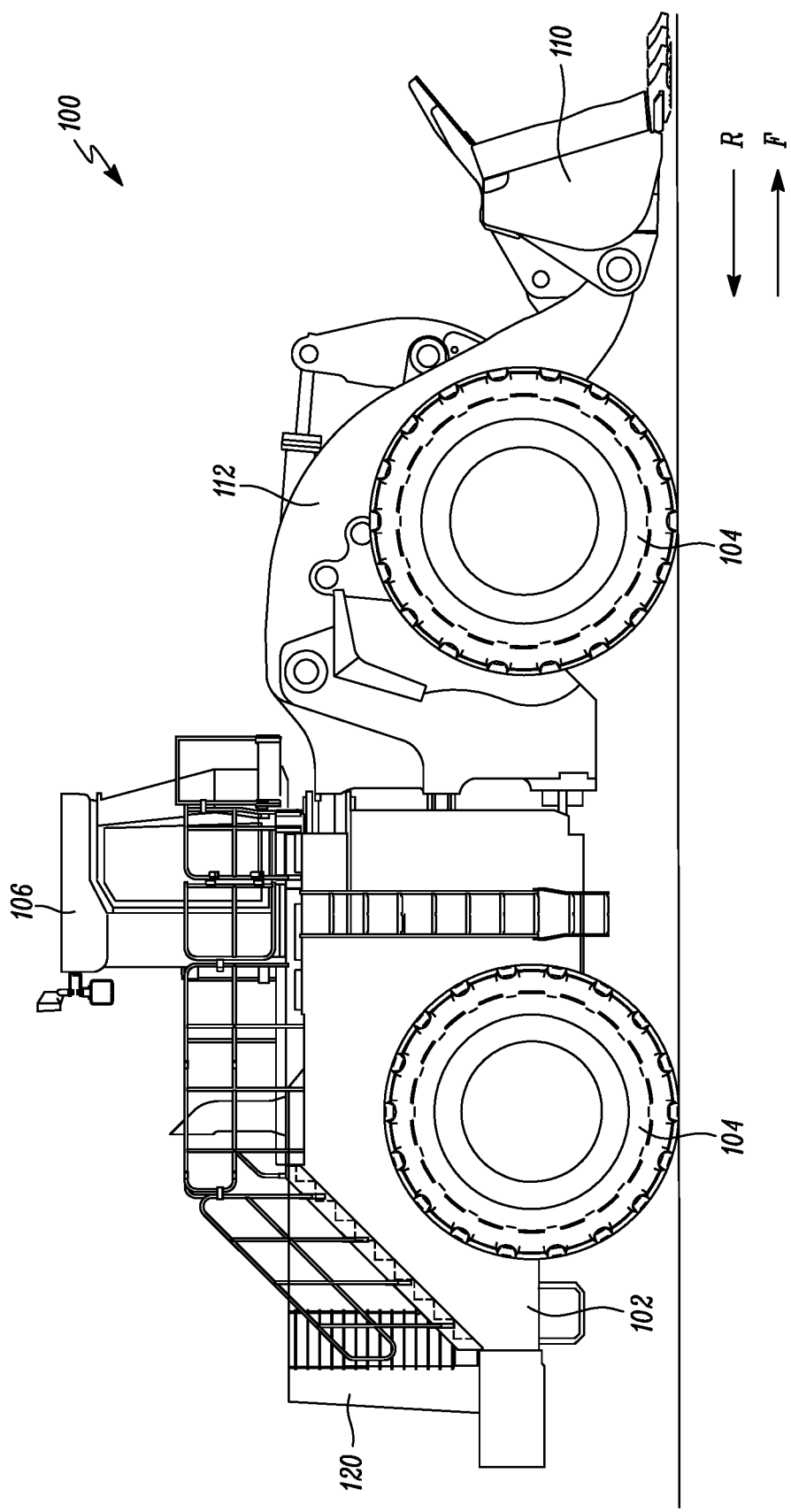
FIG. 1 is a perspective view of an exemplary machine, according to an aspect of the present disclosure.

FIG. 1 illustrates a perspective view of a machine 100, according to an embodiment of the present disclosure. In the illustrated embodiment, the machine 100 is embodied as a wheel loader. In alternative embodiments, the machine 100 may include a track type tractor, an excavator, a dozer, a harvester, a backhoe loader, a skid steer loader, or any other type of machine known in the art. The machine 100 may perform one or more than one type of operations associated with an industry, such as mining, construction, farming, transportation, or any other industry known in the art.

The machine 100 includes a frame 102. The frame 102 rotatably supports a set of ground engaging members 104 each of which is a wheel in the illustrated embodiment of FIG. 1. The ground engaging members 104 rotate about their respective axes thereby propelling the machine 100 on a ground surface. Alternatively, it can be contemplated to embody the set of ground engaging members 104 in the form of tracks (not shown) such that the tracks propel the machine 100.

Further, the machine 100 includes an operator cab 106 mounted on the frame 102. An operator of the machine 100 may be present within the operator cab 106 for operating the machine 100. The operator cab 106 includes an interface that has one or more input devices including, but not limited to, a gear shift lever 108 (shown in FIG. 2), pedals, steering, joystick, knobs, switches, and a display unit. The gear shift lever 108 allows gear shifting between various gears of the machine 100. For example, the operator may change the gear for changing a direction of the machine 100 between a forward direction "F" and a reverse direction "R". In one example, during machine operation, the operator may need to move the machine 100 in the reverse direction "R". In such an example, the operator may shift the gear shift lever 108 to a reverse gear setting of the gear shift lever 108 in order to allow movement of the machine 100 in the reverse direction "R". It should be noted that the current gear setting and the desired gear setting are based on the gear shift lever 108 while the machine 100 operates in a manual mode of operation during direction shift. In an automatic mode of operation, an automatic gear setting algorithm may be used to determine the current gear setting and the desired gear setting during direction shift.

Further, an implement 110 of the machine 100 is connected with the frame 102 of the machine 100. More particularly, the machine 100 includes a pair of lift arms 112 (only one of which is shown herein) coupled to the frame 102 of the machine 100. The lift arms 112 connect the implement 110 with the frame 102. The implement 110 performs various tasks at a worksite. The worksite may include, for example, a mine site, a landfill, a quarry, a construction site, or any other type of a worksite. The implement 110 may engage, penetrate, or cut a surface of the worksite and/or move earth to accomplish a predetermined task. Further, the implement 110 may also hold material therein for transportation of the held material from one location to another. It should be noted that when one or more operations are needed to be performed by the implement 110, the operator may shift the gear shift lever 108 to a first forward gear setting to perform the required operation. More particularly, the machine 100 needs to be in the first forward gear for performing one or more operations using the implement 110.

In the illustrated embodiment, the implement 110 is a bucket that is pivotally coupled to the lift arms 112. Although a bucket is disclosed herein, it should be noted that a type of the implement 110 disclosed herein may vary from one application to another depending on specific requirements of an application area of the machine 100. Therefore, it may be noted that the type of implement 110 disclosed herein is non-limiting of this disclosure. Other types of implements, such as a blade, may be implemented in place of the bucket depending on specific requirements of an application.

Figure 2:
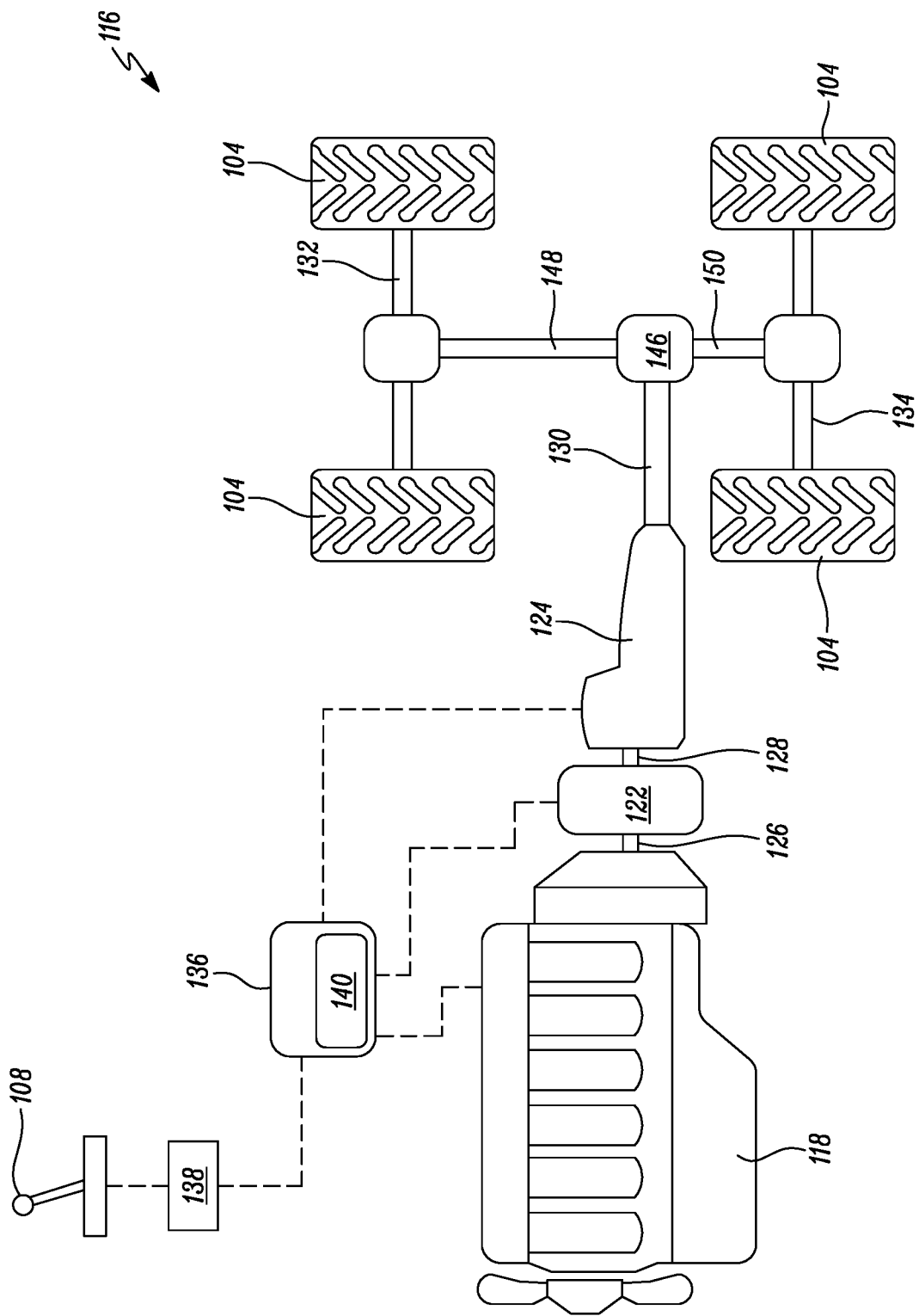
FIG. 2 is a schematic view of a powertrain associated with the machine of FIG. 1, according to an aspect of the present disclosure.

During operation of the machine 100, the lift arms 112 and the implement 110 may be moved to different positions. As shown in FIG. 2, the movement of the lift arms 112 and/or the implement 110 is controlled by lift cylinders (not shown) which are coupled to these parts. Further, the implement 110 may be pivoted relative to the lift arms 112 by means of the tilt cylinder (not shown) connected between the lift arms 112 and the implement 110. In one example, the lift and tilt cylinders are hydraulic cylinders that are operated by an implement hydraulic system (not shown) of the machine 100 based on inputs from an Electronic Control Module (ECM) present on-board the machine 100. The implement hydraulic system may include an implement pump (not shown) that pressurizes a hydraulic fluid during operation of the implement hydraulic system.

Referring to FIG. 2, the machine 100 includes a powertrain 116. The powertrain 116 includes a power source. The power source provides power to the machine 100 for operational and mobility requirements. In the illustrated embodiment, the power source is an engine 118. The engine 118 is supported by the frame 102 (see FIG. 1) and is mounted within an enclosure 120 (see FIG. 1) formed in the frame 102. The engine 118 may embody an internal combustion engine, such as a diesel engine, a gasoline engine, a gaseous fuel-powered engine, or any other combustion engine. The power source may alternatively embody an electric motor coupled to a generator. In other examples, the power source may include batteries or some other source of electrical power.

The powertrain 116 also includes a number of components, such as a torque converter 122, a transmission 124 inclusive of gearing, hydraulic pumps or motors, and other known drive links provided between the engine 118 and the ground engaging members 104 for transmission of motive power from the engine 118 to the ground engaging members 104.

An output shaft 126 of the engine 118 is connected to the torque converter 122. The torque converter 122 is used to transfer power between the engine 118 and the transmission 124. The torque converter 122 is in turn rigidly connected to the transmission 124 via an output shaft 128 for delivering power from the engine 118 to the transmission 124. In the illustrated example, the transmission 124 is embodied as an automatic transmission 124. Further, an output shaft 130 of the transmission 124 is connected to a splitter 146 that powers two drive shafts 148, 150, one for each of a front axle 132 and a rear axle 134 of the machine 100. Each drive shaft 148, 150 transmits power to the ground engaging members 104 via a differential such that a rotational power provided at the output shaft 126 of the engine 118 is effectively transmitted to the ground engaging members 104. Although two driven axles 148, 150 are shown, a single axle or more than two axles may be used depending on the type of machine 100 used. It should be noted that the transmission 124 may include numerous components that assist in transmitting power from the engine 118 to the set of ground engaging members 104.

Further, the machine 100 includes a control module 136. The control module 136 may be embodied as a separate module, or functionalities of the control module 136 may be stored and processed by the ECM, without any limitations. The control module 136 receives signals corresponding to various operating parameters of the machine 100, including the engine 118, the torque converter 122, and the transmission 124. As illustrated, a gear shift sensor 138 associated with the gear shift lever 108 is in communication with the control module 136. For example, the gear shift sensor 138 may provide information pertaining to a current gear setting or provide information indicative of the operator's commands such as when the gear shift lever 108 is being used to shift between different gear settings. When the operator performs a gear shifting operation, the control module 136 receives this information from the gear shift sensor 138. Further, the control module 136 is also in communication with the engine 118 and may send and receive information from the engine 118. In an example, the control module 136 may receive parameters indicative of an operating state of the engine 118 including a desired engine speed value and engine load.

Further, the control module 136 is also in communication with the torque converter 122 and may send and receive information from the torque converter 122. In one example, the control module 136 may receive information pertaining to a state of operation of the torque converter 122. Additionally, the control module 136 is in communication with the transmission 124 and may send and receive information from the transmission 124. In one example, the control module 136 may receive information pertaining to a current gear ratio engaged in the transmission 124. The current gear ratio may be a signal indicative of a gear arrangement of the transmission 124 that is either currently engaged or that will be engaged after a gear shift is carried out.

During an operation of the machine 100, the operator may need to change the direction of the machine 100. The operator may switch between the reverse direction "R" (see FIG. 1) and the forward direction "F" (see FIG. 1), based on operational requirements. Further, when the operator is shifting from the reverse gear to the first forward gear, the engine 118 needs to be operated at a desired engine speed value that allows smooth operation of the machine 100 and such that sufficient power is available for smooth operation of the machine 100. Additionally, the desired engine speed value needs to be such that the powertrain components do not get damaged due to excess torque applied at the powertrain components. During the direction change to the first forward gear, the output speed of the torque converter 122 is set to zero by default. Currently, machines employ a Powertrain Torque Strategy (PTS) algorithm and a Controlled Throttle Shifting (CTS) algorithm to determine a desired engine speed value of the engine 118 using a first look-up table (not shown) and a second look-up table (not shown). The PTS and CTS algorithms are executed and stored by the control module 136. Typically, while executing the PTS algorithm, the control module 136 retrieves an engine speed value based on the first look-up table.

In one example, the first look-up table contains engine speed values corresponding to various readings of a pressure of the implement pump and various readings of a torque converter speed ratio. The term "torque converter speed ratio" referred to herein is defined as a ratio between the output speed of the torque converter 122 and an input speed of the torque converter 122. More particularly, the first look-up table includes a number of rows and a number of columns. The rows correspond to different values of the pressure of the implement pump. Further, the columns correspond to different values of the torque converter speed ratio. Thus, the first look-up table maps the pressure of the implement pump with the torque converter speed ratio.

Further, based on the pressure of the implement pump and the torque converter speed ratio, the control module 136 determines the engine speed value from the first look-up table. Further, the first look-up table is generally stored in the memory 140 of the control module 136 and is retrieved therefrom. It should be noted that the probable engine speed values of the first look-up table may vary based on the type of the machine 100 and operational requirements of the machine 100.

Further, the control module 136 also determines an engine speed value based on the execution of the CTS algorithm. The CTS algorithm and the second look-up table will be explained in detail later in this section. Typically, a lower value of the engine speed values obtained from the corresponding PTS and CTS algorithms is identified as the desired engine speed. During direction change, the output speed of the torque converter 122 is set to zero by default. In such a situation, the torque converter speed ratio becomes zero, and for any value of the pressure of the implement pump, the engine speed value from the PTS algorithm corresponds to a low engine speed value. Typically, the engine speed value determined by the PTS algorithm is lesser than the engine speed value determined by the CTS algorithm. As the control module 136 determines a lower value of the engine speed values from the corresponding PTS and CTS algorithms, the control module 136 will determine the engine speed value that is obtained from PTS algorithm as the desired engine speed value. Such a low speed value results in inadequate performance of the machine 100 for an extended period of time and leads to operator complaints of low power. Thus, the present disclosure is directed towards determination of the desired engine speed value of the engine 118 that allows smoother operation of the machine 100 during the direction change of the machine 100.

Figure 3:
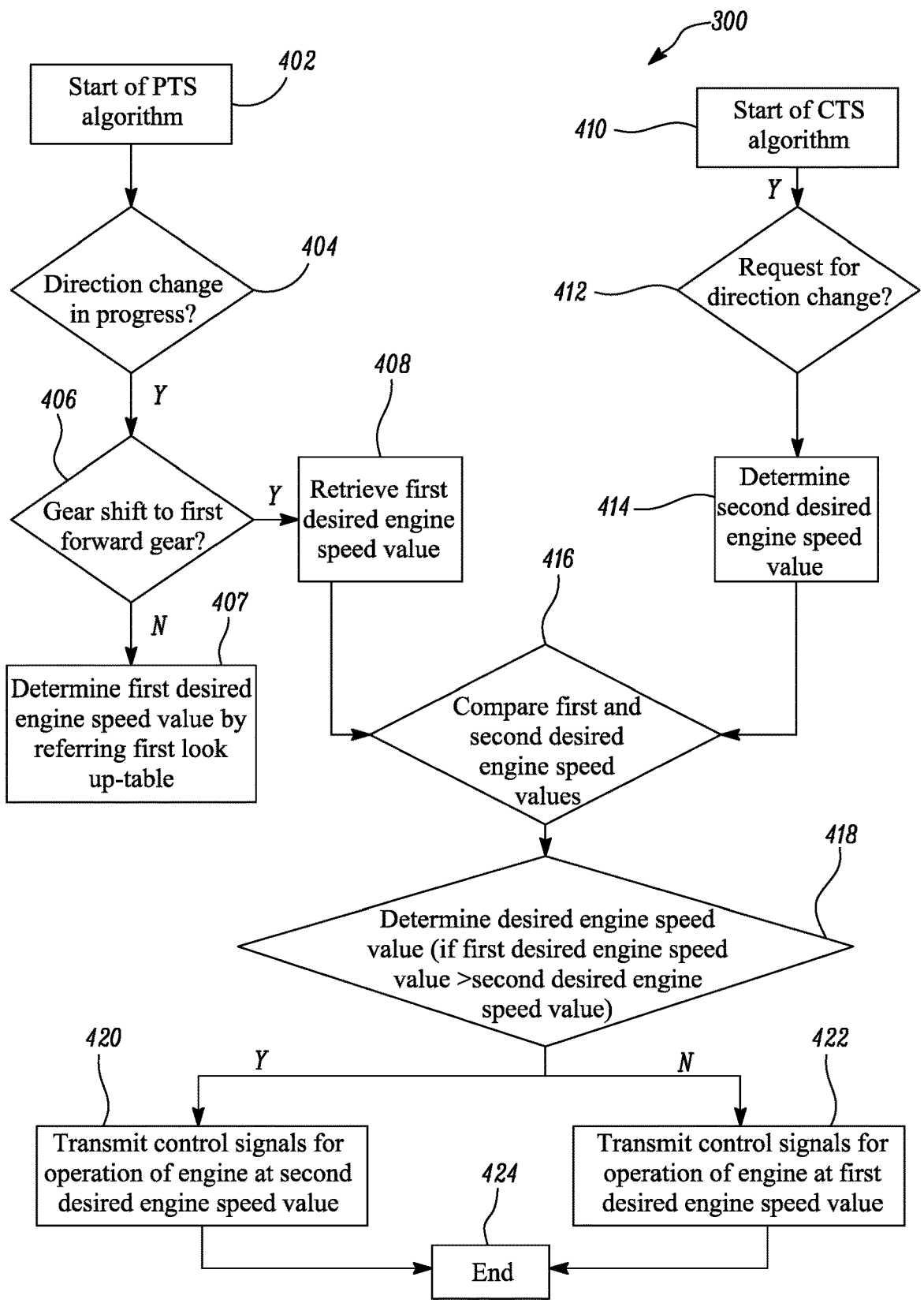
FIG. 3 is a flowchart for a process of determining a desired engine speed value of an engine, according to an aspect of the present disclosure.

FIG. 3 illustrates a flowchart for a process 400 (algorithm) for determining the desired engine speed value of the engine 118 during the direction change of the machine 100. The process 400 is implemented by the control module 136 and may be stored in a memory 140 of the control module 136. Alternatively, the process 400 may be stored and implemented by the ECM present on-board the machine 100. The process 400 is executed by the control module 136 when the operator shifts the gear shift lever 108 from the current gear setting to the desired gear setting of the gear shift lever 108. In the illustrated embodiment, the current gear setting corresponds to the reverse gear setting and the desired gear setting corresponds to the first forward gear setting. It should be noted that the process 400 applies the PTS algorithm and CTS algorithm to determine the desired engine speed value of the engine 118.

The process 400 begins at block 402 in which the method implemented by the control module 136 starts or begins operation by implementing the PTS algorithm. At block 404, the process 400 determines if the direction change is in progress. More particularly, the process 400 determines if a gear shift is in progress. If the gear shift is in progress, the process 400 moves to block 406. At block 406, the control module 136 determines if the gear shift is from one of the reverse gear settings to the first forward gear setting. If the gear shift is to the first forward gear setting, the process 400 moves to block 408. Further, at the block 408, the control module 136 retrieves a first desired engine speed value based on the detection of the direction change. The first desired engine speed value is stored in the memory 140 of the control module 136 and is retrieved therefrom.

It should be noted that in the embodiment described in the present disclosure, the process 400 bypasses the step of referring the first look-up table while performing the direction change. This is done to avoid the default torque converter output speed that is set as zero, which is not the actual speed at the torque converter output, while the gear shift is in progress. Further, the control module 136 directly retrieves the first desired engine speed value that is prestored in the control module 136. More particularly, the first desired engine speed values is embodied as a predefined speed value that is stored in the memory 140 and is retrieved therefrom by the control module 136. In one example, the first desired engine speed value may approximately lie between 1800 Revolution Per Minute (RPM) and 2500 RPM. However, the first desired engine speed value may vary based on a type of the machine 100 and operational requirements of the machine 100. It should be noted that the first desired engine speed value is set as a maximum desired speed of the engine 118, so that the second desired engine speed value gets arbitrated. More particularly, if the first desired engine speed value is greater than the maximum desired speed of the engine 118, the transmission 124 of the machine 100 may be subjected to excess torque during gear shifting which is not desirable. However, if the gear shift is not to the first forward gear setting, the process 400 moves to block 407 and determines the first desired engine speed value by referring to the first look-up table.

As shown in FIG. 3, the process 400 starts simultaneous execution of the CTS algorithm at block 410. At block 412, the process 400 determines if the operator has requested the direction change. If the direction change is in progress, the process 400 moves to block 414. At the block 414, the control module 136 determines the second desired engine speed value based on the detection of the direction change. The second desired engine speed value is determined based on the current gear setting of the gear shift lever 108 and the desired gear setting of the gear shift lever 108. Further, the control module 136 determines the second desired engine speed value based on the second look-up table.

The second look-up table contains second desired engine speed values corresponding to different gear settings on the gear shift lever 108. More particularly, the second look-up table includes four rows and four columns depending on the number of gears on the machine 100. The four rows correspond to the forward gear settings of the gear shift lever 108. More particularly, the four rows include a first forward gear setting, a second forward gear setting, a third forward gear setting, and a fourth forward gear setting. Further, the four rows correspond to the reverse gear settings of the gear shift lever 108. More particularly, the four columns include a first reverse gear setting, a second reverse gear setting, a third reverse gear setting, and a fourth reverse gear setting. Thus, the second look-up table maps the four forward gear settings with the four reverse gear settings.

Further, based on the current gear setting and the desired gear setting, the control module 136 determines the second desired engine speed value from the second look-up table. More particularly, when the current gear setting corresponds to the first reverse gear setting and the desired gear setting corresponds to the first forward gear setting, the control module 136 will refer to the second look-up table and accordingly determines the second desired engine speed value. Further, the second look-up table is stored in the memory 140 of the control module 136 and is retrieved therefrom. The probable second desired engine speed values given in the second look-up table are embodied as optimum speed values at which the engine 118 can operate during the direction change without causing any damage to the components of the powertrain 116. It should be noted that the probable second desired engine speed values of the second look-up table values may vary based on the type of the machine 100 and operational requirements of the machine 100.

The process 400 then moves to block 416. At the block 416, the control module 136 compares the first desired engine speed value and the second desired engine speed value. Further, at block 418, the control module 136 determines the desired engine speed value based on the comparison between the first desired engine speed value and the second desired engine speed value performed at the block 416. More particularly, at the block 418, the control module 136 identifies the lower value of the first desired engine speed value and the second desired engine speed value as the desired engine speed value. Thus, if the second desired engine speed value is lower than the first desired engine speed value which corresponds to the maximum desired speed value of the engine 118, the second desired engine speed value determined by the CTS algorithm is identified as the desired engine speed value of the engine 118.

If the second desired engine speed value is less than the first desired engine speed value, the process 400 moves to block 420. At the block 420, the control module 136 transmits control signals for operation of the engine 118 at the desired engine speed value i.e. the second desired engine speed value. In one example, the control module 136 transmits the desired engine speed value directly to the engine 118. Alternatively, the control module 136 transmits the desired engine speed value to the ECM of the machine 100. Further, the process 400 terminates operation at block 424. However, if the first desired engine speed value is less than the second desired engine speed value, the process 400 moves to block 422. At the block 422, the control module 136 transmits control signals for operation of the engine 118 at the desired engine speed value i.e. the first desired engine speed value. Further, the process 400 terminates operation at the block 424.

The control module 136 may embody a single microprocessor or multiple microprocessors for receiving signals from components of the machine 100. Numerous commercially available microprocessors may be configured to perform the functions of the control module 136. It should be appreciated that the control module 136 may embody a machine microprocessor capable of controlling numerous machine functions. A person of ordinary skill in the art will appreciate that the control module 136 may additionally include other components and may also perform other functions not described herein.

INDUSTRIAL APPLICABILITY

The present disclosure relates to a method 600 for determining the desired engine speed value of the engine 118 of the machine 100 during the direction change of the machine 100. The method 600 improves machine performance during direction change and allows smoother operation of the machine 100. Further, the desired engine speed value determined by the method 400 is decided such that if the engine 118 is operated at the determined desired engine speed value, the powertrain components are not subjected to excess torque during the direction change, thereby safeguarding the components from damage. Further, the method 600 also reduces number of customer complaints by providing high engine power immediately after shifting to the first forward gear from the reverse gear. Thus, using the disclosed method 600, the desired engine speed value of the machine 100 that does not include a torque converter output speed sensor may be easily determined.

Figure 4:
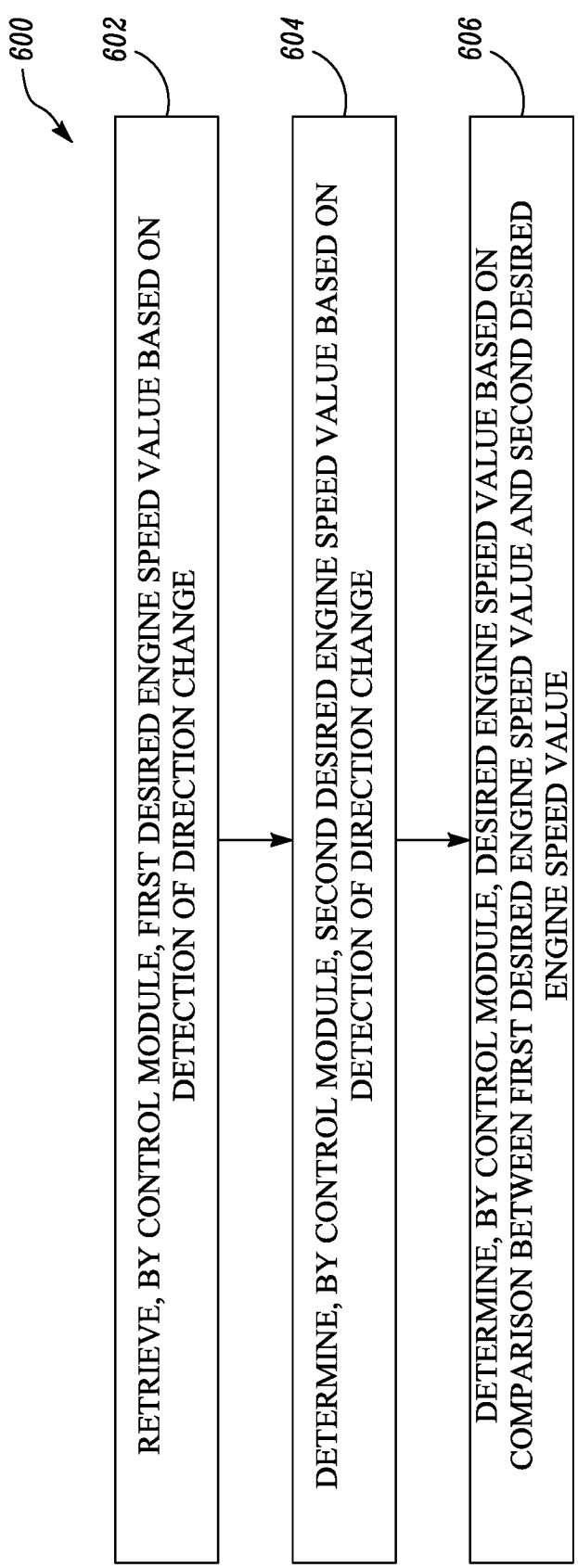
FIG. 4 is a flowchart for a method of determining the desired engine speed value of the engine, according to an aspect of the present disclosure.

The method 600 for determining the desired engine speed value of the engine 118 of the machine 100 during the direction change of the machine 100 will now be described with reference to FIG. 4. The machine 100 includes the implement 110, the torque converter 122, and the transmission 124. Further, the control module 136 determines the desired engine speed value during the direction change of the machine 100 from the reverse direction "R" to the forward direction "F". At step 602, the control module 136 retrieves the first desired engine speed value based on the detection of the direction change. It should be noted that the first desired engine speed value is stored in the memory 140 of the control module 136.

At step 604, the control module 136 determines the second desired engine speed value based on the detection of the direction change. The second desired engine speed value is determined based on the current gear setting of the gear shift lever 108 and the desired gear setting of the gear shift lever 108. In the illustrated embodiment, the current gear setting corresponds to the reverse gear setting and the desired gear setting corresponds to the first forward gear setting. The control module 136 determines the second desired engine speed value based on the second look-up table. The second look-up table contains engine speed values corresponding to different gear settings on the gear shift lever 108. It should be noted that the second look-up table is stored in the memory 140 of the control module 136.

At step 606, the control module 136 determines the desired engine speed value based on the comparison between the first desired engine speed value and the second desired engine speed value. The control module 136 identifies the lower value of the first desired engine speed value and the second desired engine speed value as the desired engine speed value. Further, the control module 136 transmits control signals for operation of the engine 118 at the desired engine speed value.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A method for determining a desired engine speed value of an engine of a machine during a direction change of the machine, the method comprising:
   retrieving, by a control module, a first desired engine speed value based on a detection of the direction of change;
   determining, by the control module, a second desired engine speed value based on the detection of the direction change, the second desired engine speed value being determined based on a current gear setting of a gear shift lever and a desired gear setting of the gear shift lever; and
   determining, by the control module, the desired engine speed value based on a comparison between the first desired engine speed value and the second desired engine speed value, the determining of the desired engine speed value based on the comparison including identifying a lower value of the first desired engine speed value and the second desired engine speed value as the desired engine speed value.

2. The method of claim 1, wherein the desired engine speed value is determined during the direction change of the machine from a reverse direction to a forward direction.

3. The method of claim 1, wherein the current gear setting corresponds to a reverse gear setting and the desired gear setting corresponds to a first forward gear setting.

4. The method of claim 1, wherein the machine includes an implement, a torque converter, and a transmission.

5. The method of claim 1, further comprising transmitting, by the control module, control signals for operation of the engine at the desired engine speed value.

6. The method of claim 1, wherein determining the second desired engine speed value includes determining the second desired engine speed value based on a look-up table.

7. The method of claim 6, wherein the look-up table includes engine speed values corresponding to different gear settings on the gear shift lever.

8. The method of claim 6, wherein the first desired engine speed value and the look-up table are stored in a memory of the control module.

9. A power train for a machine comprising:
   an engine;
   a torque converter connected to the engine;
   a transmission connected to the torque converter; and
   a control module configured to determine a desired engine speed value of the engine during a direction change of the machine, wherein the control module is configured to:
   retrieve a first desired engine speed value based on a detection of the direction change;
   determine a second desired engine speed value based on the detection of the direction change, the second desired engine speed value being determined based on a current gear setting of a gear shift lever and a desired gear setting of the gear shift lever; and
   determine the desired engine speed value based on a comparison between the first desired engine speed value and the second desired engine speed value, the control module being configured to identify a lower value of the first desired engine speed value and the second desired engine speed value as the desired engine speed value.

10. The powertrain of claim 9, wherein the control module is configured to identify the desired engine speed value during the direction change of the machine from a reverse direction to a forward direction.

11. The powertrain of claim 9, wherein the current gear setting corresponds to a reverse gear setting and the desired gear change corresponds to a first forward gear setting.

12. The powertrain of claim 9, wherein the control module is configured to transmit control signals for operation of the engine at the desired engine speed value.

13. The powertrain of claim 9, wherein the control module is configured to determine the second desired engine speed value based on a look-up table.

14. The powertrain of claim 13, wherein the look-up table includes engine speed values corresponding to different gear settings on the gear shift lever.

15. The powertrain of claim 13, wherein the first desired engine speed value and the look-up table are stored in a memory of the control module.

16. A machine comprising:
a frame;
an implement connected to the frame of the machine;
an engine supported by the frame of the machine;
a torque converter connected to the engine;
a transmission connected to the torque converter; and
a control module configured to determine a desired engine speed value of the engine during a direction change of the machine, wherein the control module is configured to:
retrieve a first desired engine speed value based on a detection of the direction change;
determine a second desired engine speed value based on the detection of the direction change, the second desired engine speed value being determined based on a current gear setting of a gear shift lever and a desired gear setting of the gear shift lever; and
determine the desired engine speed value based on a comparison between the first desired engine speed value and the second desired engine speed value, the control module being configured to identify a lower value of the first desired engine speed value and the second desired engine speed value as the desired engine speed value.

17. The machine of claim 16, wherein the current gear setting corresponds to a reverse gear setting and the desired gear setting corresponds to a first forward gear setting.

18. The machine of claim 16, wherein the control module is configured to transmit control signals for operation of the engine at the desired engine speed control value.

19. The machine of claim 16, wherein the control module is configured to determine the second desired engine speed value based on a look-up table.

20. The machine of claim 16, wherein the look-up table includes engine speed values corresponding to different gear settings of the gear shift lever.

\* \* \* \* \*